No. 797,240. PATENTED AUG. 15, 1905.
R. SYMMONDS, Jr.
REVERSING AND CHANGE SPEED CLUTCH MECHANISM.
APPLICATION FILED AUG. 25, 1904.

2 SHEETS—SHEET 1.

No. 797,240. PATENTED AUG. 15, 1905.
R. SYMMONDS, Jr.
REVERSING AND CHANGE SPEED CLUTCH MECHANISM.
APPLICATION FILED AUG. 25, 1904.

2 SHEETS—SHEET 2.

Witnesses:
H. S. Gaither
Fred G. Fischer

Inventor:
Robert Symmonds Jr
by Burton & Burton
Attorneys

UNITED STATES PATENT OFFICE.

ROBERT SYMMONDS, JR., OF KENOSHA, WISCONSIN, ASSIGNOR TO THOMAS B. JEFFERY, OF KENOSHA, WISCONSIN.

REVERSING AND CHANGE-SPEED CLUTCH MECHANISM.

No. 797,240. Specification of Letters Patent. Patented Aug. 15, 1905.

Original application filed May 25, 1904, Serial No. 209,676. Divided and this application filed August 25, 1904. Serial No. 222,180.

*To all whom it may concern:*

Be it known that I, ROBERT SYMMONDS, Jr., a citizen of the United States, residing at Kenosha, in the county of Kenosha and State of Wisconsin, have invented new and useful Improvements in Reversing and Change-Speed Clutch Mechanism, of which the following is a specification, reference being had to the accompanying drawings, forming a part thereof.

This application is a division of my application, Serial No. 209,676, filed May 25, 1904.

The purpose of this invention is to provide an improved mechanism for transmitting the power from a motor to the axles of a motor-vehicle with capacity for varying the speed and reversing the direction of travel.

It consists of the features of construction set out in the claims.

Figure 1:
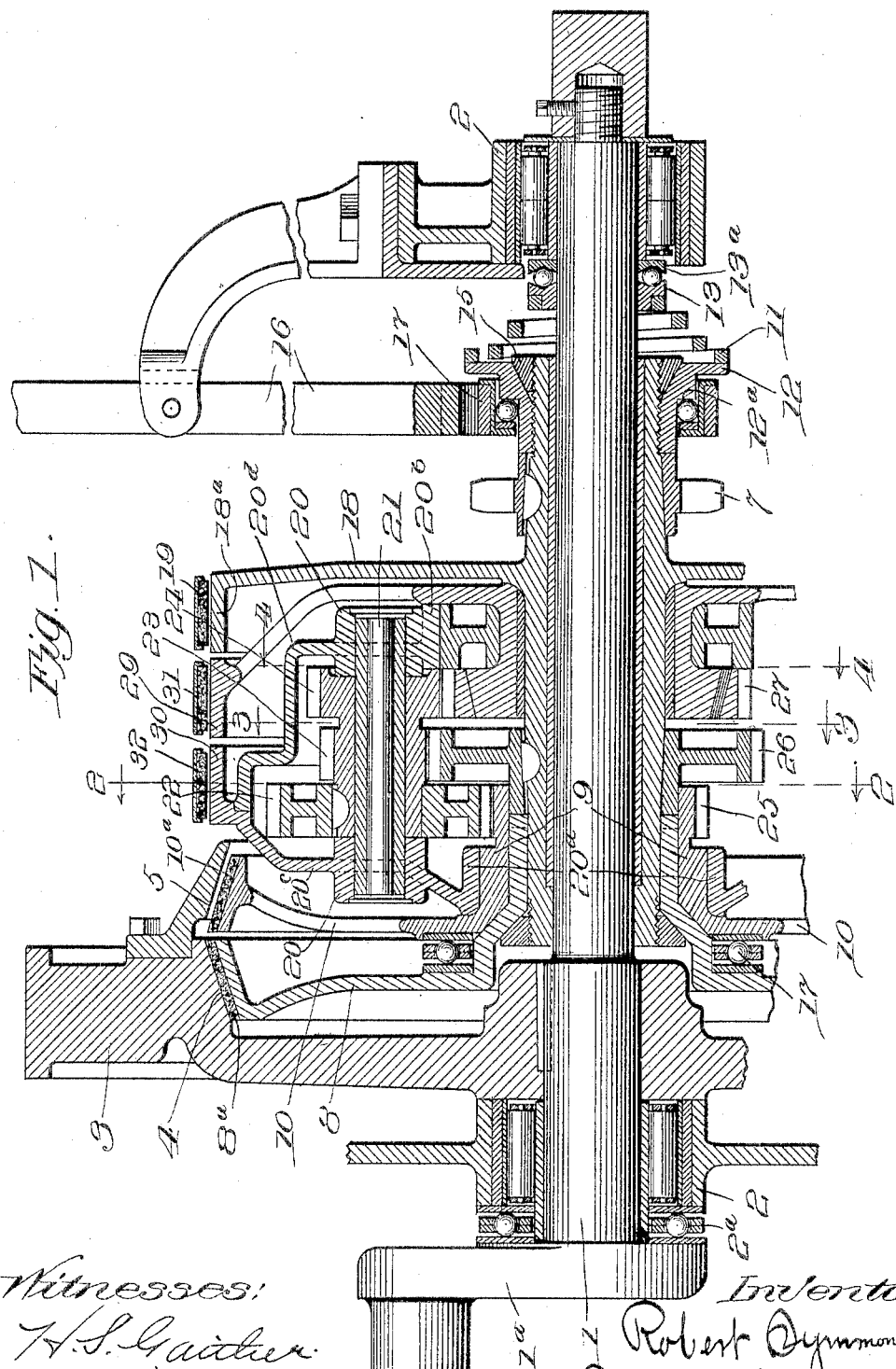
Figure 2:
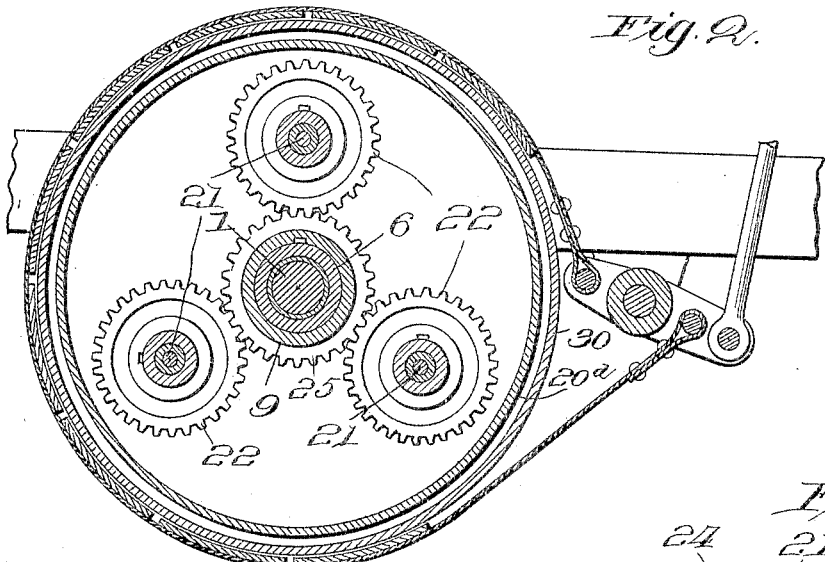
Figure 3:
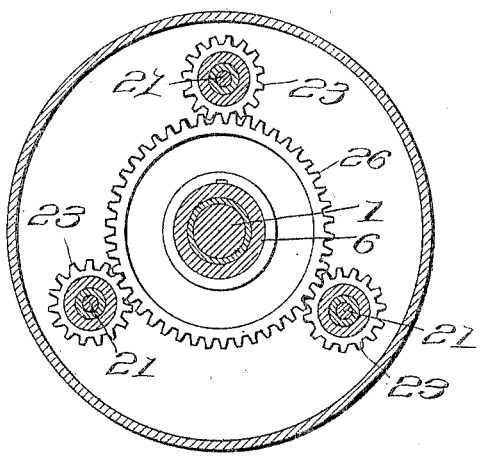
Figure 4:
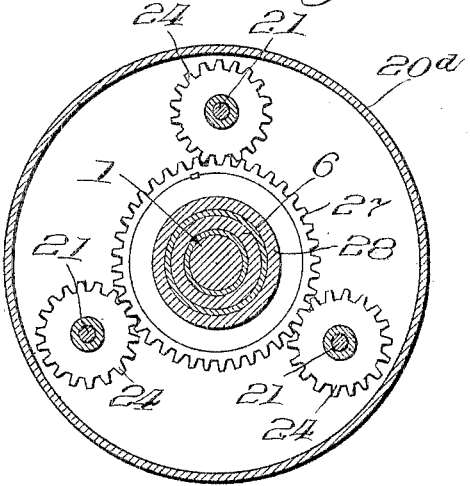
Figure 5:
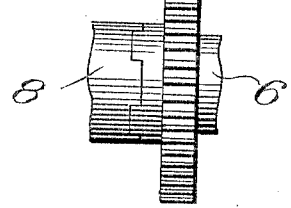

In the drawings, Figure 1 is a section through the power-transmitting train-axle with respect to the main or fly-wheel shaft, a portion of the fly-wheel and planetary train at one side of the shaft being broken away. Fig. 2 is a section at the line 2 2 on Fig. 1. Fig. 3 is a section at the line 3 3 on Fig. 1. Fig. 4 is a section at the line 4 4 on Fig. 1. Fig. 5 is a detail view showing the mode of coupling the two parts of a planetary system.

On the crank-shaft 1, which has journal-bearings in the frame, one of which is shown at 2, there is fast the fly-wheel 3, which has two inwardly-facing oppositely-inclined friction-faces 4 and 5. On the shaft 1 the sleeve 6 is mounted with capacity for sliding and rotating. Rigid with the sleeve there is a sprocket-pinion 7 for driving, by means of a chain, (not shown,) the vehicle-axle. (Not shown.) Said sleeve 6 is, in effect, the shaft of a disk wheel 8, having friction-face $8^a$ for engagement with the friction-face 4 of the fly-wheel, and outside the sleeve 6 there is sleeved thereon a shaft 9 of the disk wheel 10, having a friction-face $10^a$ for engagement with the friction-face 5 of the wheel 3. A helical spring 11 is coiled about the shaft 1 and bears at one end against the flange-collar 12, which is screwed onto the end of the sleeve-shaft 6, said spring having its other end provided with a bearing-collar 13, which forms one member of a ball-bearing, of which the opposite member $13^a$ is a stop-collar made fast on the shaft 1. The spring 11 thus tends to hold the sleeve-shaft 6 and the friction-disks 8 and 10 in the position shown in Fig. 1, in which the disk 8 has its face $8^a$ in engagement with the friction-face 4 of the wheel 3.

15 is an exteriorly-tapered jam-nut screwed onto the reduced end of the sleeve 6, entering a correspondingly-tapered counterbore in the face of the collar 12 for making the same secure on said sleeve-shaft. A lever 16, operated in any convenient manner, (not shown,) has an eye 17, encompassing the hub of the collar 12 and forming one side of a ball-bearing, of which the other side is formed, at the shoulder $12^a$ of the collar. The purpose of this lever is to force the sleeve against the tension of the spring 11 to withdraw the disk 8 from the friction-face 4 and carry the friction-face of the disk 10 into engagement with the face 5.

The shaft 1 is longitudinally stopped on the frame by the frame-bearing 2 between the hub of the fly-wheel 3 and the hub of the crank $1^a$, and to relieve the end thrust of the shaft in certain operations hereinafter described there is provided intermediate said bearings and the crank-hub the antifriction device consisting of a ball-bearing annulus $2^a$, with the balls therein exposed at opposite sides to the opposing surfaces of the bearing and hub, respectively. The ball-bearings described between the collar 12 at one end of the spring 11 and the stop-collar 13 and those provided between the opposite side of the collar 12 and the lever 16 are desirable, because the pressure of the spring 11 furnishing the entire driving grip between the surfaces $8^a$ and 4 must exert great pressure, and since the lever 16 in compressing the spring 11 to shift the friction-disks carrying the face 10 into engagement with the face 5 must overcome the tension of this spring very objectionable friction between the lever and the collar 12 would be caused, making the ball-bearings at that point desirable, and the end thrust of the shaft, due to the same tension of the springs, is taken by the ball-bearings $2^a$ between the crank-hub $1^a$ and the bearing 2. In thus shifting the disk by means of the lever 16 against the face of the spring 11 it will be seen that the pressure necessary to cause frictional engagement of the face $10^a$ with the face 5 is transmitted from the disk 8 to the disk 10, the last-mentioned disk being directly operated by the lever 16 sliding the sleeve-shaft 6 on the shaft 1, and since, as will hereinafter appear, the two disks 8 and 10 have different speeds and sometimes opposite directions of movement when the disk 10 is engaged with the face 5 it is necessary to provide ball-bearings between these two disks where the one transmits driving pressure to the other, and such ball-bearings are shown conventionally at 17. The specific construction of the ball-bearings at each of the three positions described may be according to the judgment of the mechanic, and no specific form of such bearings is material to my invention.

Without regard to the remainder of the construction not yet described it will be seen that when the disk 8 is engaged with the face 4, as shown in Fig. 1, the rotation of the fly-wheel 3 drives the power-communicating sprocket-wheel 7 in the same direction and with the same speed as the fly-wheel. This adjustment of the parts gives the high-speed movement for forward travel. The sleeve 6 has rigid with it the flange-disk 18. This flange $18^a$ is encompassed by the strap-brake 19, adapted to be operated in a familiar manner, which will be understood from the drawings without description, to apply restraining friction to the flange $8^a$, and thereby retard the action with the ordinary purpose of the vehicle-brake, and it will be understood that the lever 16 may be moved to a position at which it will hold the friction-faces $8^a$ and $10^a$ on the disks 8 and 10, respectively, intermediate between and out of engagement with both the friction-faces 4 and 5 of the wheel 3, thus disengaging the power-shaft from the vehicle-axle and rendering the application of the brake to the flange $18^a$ effective for bringing the vehicle to rest or slackening its momentum.

For giving a regulated low speed and for reversing movement there is provided a planetary-gear train which will now be described. This train comprises the frame 20, which is journaled about the shaft 1, being directly seated at $20^a$ on the hub or sleeve shaft 9 of the disk 10 and at $20^b$ on the reversing-pulley 29, hereinafter described, which is itself directly journaled on the sleeve 6 inside the brake-pulley 18—that is, between the same and the fly-wheel. In this frame 20 there are journaled two or more—as illustrated three—planetary-gear shafts 21, each of which has rigid with it three gears 22, 23, and 24. The gear 22 meshes directly with a pinion 25, which is rigid and preferably integral, as shown, with the sleeve-shaft 9 of the disk 10. The gear 23 meshes with a gear 26, fast on the sleeve-shaft 6, and the gear 24 meshes with a gear 27, which is formed upon the hub or sleeve shaft 28 of the reversing-pulley 29, which is in turn journaled upon the sleeve 6, as above stated. The reversing-pulley 29 is of the same diameter as the brake-pulley 18. The frame 20 is formed in two parts having, respectively, the bearings $20^a$ and $20^b$ mentioned for journaling the frame, as described, and these two parts are secured together by the axles 21 of the integral gears 22, 23, and 24 and are extended in the webs $20^d$ and $20^c$ to form a housing inclosing said gears, and said housing is further extended to form a slow-speed pulley 30 of the same diameter as the reversing-pulley and the brake-pulley. The pulleys 29 and 30 are provided with strap-brakes 31 and 32, respectively, similar to the brake 19. The gears 25 and 22 are equal in diameter, having each thirty teeth. The gears 26 and 23 have, respectively, forty-five and fifteen teeth, and the gears 27 and 24 have, respectively, forty-one and nineteen teeth. From these ratios between the intermeshing gears of the three pairs and from the mounting of the gears 25, 26, and 27, rigid, respectively, with the disk 10, disk 8, and reverse-pulley 28, the operation of the device, which will now be described, is derived.

With the motor in operation and the wheel 3 revolving, the lever 16 being moved to position at which both the disks 8 and 10 are out of engagement with the corresponding friction-faces 4 and 5 of the wheel 3, the vehicle will be at rest. For starting, the lever 16 being moved to the right, compressing the spring 11, brings the friction-face $10^a$ of the disk 10 into operative engagement with the face 5 of the wheel 3, and thereby said disk 10, with its hub 9 and gear 25, is rotated at the speed of the fly-wheel 3; but this rotation of the disk 10 will not communicate any motion to the sprocket-wheel 7 until the brake 19 is released, nor will the release of the brake 19 cause any positive rotation of the sprocket-wheel 7 until either the planetary-gear frame or the reverse-pulley is positively held. For slow speed the brake 32 will now be clamped onto the pulley-flange 30, thereby causing the planetary-gear frame to be arrested and held. Upon this the gear 25, rotating the gear 22 at equal speed, causes all the gears 22, 23, and 24 to rotate about the axle 21 and the gear 23 to communicate to the gear 26 speed reduced to one-third that of the fly-wheel, and said gear 26 being rigid with the sleeve 6 and sprocket-wheel 7 rotates the latter at one-third the speed of the fly-wheel. In this action the gear 24, engaging the gear 27, rotates the reversing-pulley 28 and its flange 29 about the sleeve 6; but such rotation is idle—that is, it accomplishes no result. For reversing speed the brake 31 will be clamped upon the flange 29 of the reversing-pulley and the brake 32 will be released from the pulley-flange 30. The reversing-pulley 28 being now held while the planetary-gear frame is free to rotate, the result will be the planetary travel of said gear-frame and all the gears 22, 23, and 24 therein about the axle of the shaft 1 by reason of the engagement of the gear 24 with the gear 27, the latter operating as a fixed circular rack, the planetary travel being derived from the engagement of the gear 25 with the gear 22, said gear 25 having the rotary speed of the fly-wheel. The planetary movement about the axis of the shaft 1, it will be seen, will be in the reverse direction from that of the fly-wheel, but slower than the latter in the ratio of nineteen to forty-one. If the wheels 23 and 26 bore to each other the same ratio as the wheels 24 and 27, there would result from this planetary action no rotation of the shaft 6, and if the gear 26 would be conceived of as engaged at its periphery by a point at the axis of the shaft 21 the gear 26 would be rotated about the shaft 1 and would rotate the sleeve 6 and sprocket-wheel 7 about that shaft in direction reverse to that of the fly-wheel and at the speed of the planetary-gear frame about the shaft—that is, a speed bearing to that of the fly-wheel a ratio of nineteen to forty-one. With the construction shown, therefore, it will be seen that the engagement of the gear 23 with the gear 26 will give to the latter rotation in a direction the reverse of that of the wheel 3 at a speed less than that of the planetary movement of the gear-frame by as much as the gear 23 would rotate the gear 26 if the planetary frame were at rest—that is to say, each revolution of the gear 25, giving one revolution to the gear 22, and therefore one to the gear 24, about the common axis of the two gears will cause the planetary frame to travel over nineteen teeth of the gear 27, and in the same revolution the gear 23, rolling around the gear 26 a distance corresponding to nineteen teeth of the gear 27 will roll the gear 26 back one-third of its circumference, making its net reverse movement the difference between one-third and nineteen forty-firsts. Thus the device is adapted to give a forward speed limited only by the speed of the fly-wheel, or a slow speed forward one-third of the fast speed, or a slow speed backward the difference between said one-third and nineteen forty-firsts.

I claim—

1. In a power-transmitting mechanism, in combination with a power-shaft, elements rigid therewith constituting driving clutch members for two clutches; two driven clutch members corresponding to said driving clutch members respectively; a driven shaft and power-communicating connections from both said driven clutch members to said shaft, said driving-shaft, driven shaft and driven clutch members being conaxial, the two driven clutch members being adapted to be engaged with their corresponding driving clutch members respectively by movement in opposite directions longitudinally with respect to said driving and driven shafts.

2. In a power-transmitting mechanism, in combination with a power-shaft, a wheel rigid therewith comprising the driving members of two clutches; a driven shaft, the driven members of the two clutches, and power-communicating connections from both said driven members to said driven shaft adapted for communicating to said shaft different movements, said driving-shaft, driven shaft and clutch members being conaxial, and the driven clutch members being located both on the same side of the wheel having the driving clutch members, and adapted to be engaged with their respective driving clutch members on said wheel by movement in opposite directions longitudinally with respect to the shaft.

3. In a power-transmitting mechanism, in combination with a power-shaft, a wheel fixed thereon comprising the driving elements of two clutches; driven elements of said clutches respectively, both located on the same side of the wheel and adapted to be engaged with their respective driving elements on said wheel by movement in opposite directions longitudinally with respect to the shaft; means holding said two driven elements in fixed relation to each other with respect to longitudinal position on the shaft, whereby they are both moved together for engagement of one and disengagement of the other with their respective driving members, and antifriction devices interposed between said driven clutch members.

4. In a power-transmitting mechanism, in combination with a power-shaft, an element rotating therewith comprising the driving members of two clutches; a driven shaft; the driven members of said two clutches respectively longitudinally stopped on the driven shaft and adapted to be engaged with their respective driving members by opposite movement longitudinally with respect to the shaft, and power-communicating connections from both said driven members to said shaft for communicating to the shaft different movements, said driving-shaft, driven shaft and driven clutch members being conaxial; a stop which is fixed longitudinally with respect to the power-shaft; a spring reacting between said stop and the driven shaft; a lever operatively connected with said driven shaft for thrusting the latter against the reaction of the spring, and antifriction devices interposed between said spring and its stop and between the lever and the means on the driven shaft for receiving the pressure of the lever.

5. In a power-transmitting mechanism, in combination with a power-shaft, a wheel fixed thereon comprising the driving members of two clutches; driven members of said two clutches respectively concentric with the shaft, located at the same side of said wheel and adapted to be engaged with their respective driven members by opposite movement longitudinally with respect to the shaft; a driven shaft conaxial with the driving-shaft having the said driven clutch members longitudinally stopped on it; power-communicating connections from said driven clutch members to said driven shaft for giving it different movements; a fixed stop; a spring reacting between said stop and the driven shaft for resisting the movement of the latter longitudinally in one direction, the power-shaft being longitudinally stopped against movement in the same direction; a lever operatively connected with the driven shaft for giving it movement in that direction, and antifriction devices interposed between the fixed stop and the spring, between the longitudinal shaft and its said stop and between the lever and the means on the driven shaft for receiving the pressure of the lever.

6. In a power-transmitting mechanism, in combination with a power-shaft and wheel thereon comprising the driving members of two clutches; a driven shaft sleeved on the driving-shaft, the driven members of said clutches longitudinally stopped on said sleeved driven shaft and adapted to be engaged with their respective driving members by opposite movement longitudinally with respect to the power-shaft; power-communicating connections from said driven clutch members to said driven shaft for giving the latter different movements; means for moving the driven shaft longitudinally on the power-shaft to carry said driven clutch members into and out of engagement with their respective driving members, and antifriction devices interposed between said driven clutch members.

7. In a power-transmitting mechanism, in combination with a power-shaft, a wheel rigid thereon comprising the driving members of two clutches; driven members of said clutches, both located on the same side of said wheel and adapted for engagement with their respective driving members by opposite movement longitudinally with respect to the shaft; a spring stopped thereagainst, a driven shaft sleeved on said driving-shaft and having said driven clutch members longitudinally stopped on it, and means for moving said driven shaft longitudinally with respect to the power-shaft to carry the driven clutch members into and out of engagement with their respective driving members.

8. In a power-transmitting mechanism, in combination with a power-shaft, a wheel rigid thereon comprising the driving members of two clutches; driven members of said clutches, both located on the same side of said wheel and adapted for engagement with their respective driving members by opposite movement longitudinally with respect to the shaft; a driven shaft sleeved on said driving-shaft and having said driven clutch members longitudinally stopped on it; means for moving said driven shaft longitudinally with respect to the power-shaft to carry the driven clutch members into and out of engagement with their respective driving members, and ball-bearings interposed laterally between the two driven clutch members.

9. In a motor-vehicle, in combination with a power-shaft, a fly-wheel thereon having two friction-surfaces; two friction-wheels adapted to be brought into frictional engagement with said surfaces respectively by movement of their respective shafts in opposite directions, said friction-wheels having their said shafts sleeved about the power-shaft, and means for stopping said sleeved shafts longitudinally relatively to each other; a stop longitudinally fixed with respect to the power-shaft; a spring reacting between said stop and one of said frictional wheel-shafts to thrust the latter in direction for engaging the other friction-wheel with its corresponding friction-face of the fly-wheel; antifriction devices for transmitting the thrust from one of said shafts to the other, and an antifriction-bearing for receiving the opposite thrust of the spring interposed between said spring and its stop on the power-shaft.

10. In a motor-vehicle in combination with a power-shaft; a fly-wheel thereon having two friction-surfaces; two friction-wheels adapted to be brought into frictional engagement with said surfaces respectively by movement of their respective shafts in opposite directions, said shafts being sleeved about the power-shaft; means for stopping them longitudinally with respect to each other in both directions with a range of relative longitudinal movement; a stop fixed longitudinally with respect to the power-shaft; a spring reacting between said stop and one of the sleeve-shafts; a lever operatively connected with said sleeve-shaft for thrusting the latter against the reaction of the spring, and antifriction devices interposed between the spring and its stop on the power-shaft and between the lever and the means on the sleeve-shaft for receiving the pressure of the lever.

11. In a motor-vehicle, in combination with the power-shaft, a fly-wheel thereon having two friction-surfaces; two friction-wheels adapted to be brought into frictional engagement with said surfaces respectively by movement of their respective shafts in opposite directions, said shafts being sleeved about the power-shaft and longitudinally stopped with respect to each other in both directions with a range of relative longitudinal movement; an antifriction device for receiving the longitudinal thrust of one shaft upon the other in one direction; a stop fixed with respect to the power-shaft and reacting upon one of the sleeve-shafts to thrust it in said direction; a lever operatively connected with the other sleeve-shaft for thrusting it in the opposite direction, and antifriction devices between the spring and its stop on the power-shaft for receiving the pressure of the lever in said opposite direction.

12. In a motor-vehicle, in combination with a power-shaft, a fly-wheel thereon having two friction-surfaces; two friction-wheels adapted to be brought into engagement with said friction-surfaces respectively by movement of their respective shafts in opposite directions, said shafts being sleeved about the power-shaft and longitudinally stopped with respect to each other in both directions with a range of relative longitudinal movement; antifriction devices for transmitting the thrust of one of said sleeved shafts to the other in one direction; a stop on the power-shaft; a spring reacting between said stop and one of the sleeved shafts to thrust it in said direction; a lever operatively connected with said sleeved shaft for thrusting it against the reaction of the spring; antifriction devices between one end of the spring and its stop on the power-shaft and between the lever and the means by which it engages the sleeve for thrusting it against the reaction of the spring, the power-shaft being longitudinally stopped at its bearing in both directions, and antifriction devices for receiving the thrust of the shaft in both directions at said bearings.

13. In a motor-vehicle, in combination with a power-shaft, a wheel thereon having two friction-faces; two friction-disks between said faces in position for engagement therewith by movement in opposite directions toward said faces respectively, both said friction-disks having their shafts sleeved about the power-shaft, and means for stopping said shafts longitudinally relatively to each other; antifriction devices between said two disks; a spring reacting between one of said shafts and a fixed stop with a tendency to force both disks in direction for engaging one of them with the corresponding friction-face of the wheel on the power-shaft, and an antifriction-bearing for receiving the inthrust interposed between said spring and the fixed stop against which it reacts.

14. In a motor-vehicle, in combination with a power-shaft, a wheel thereon having two friction-faces; two friction-disks in position for engagement with said faces by movement in opposite directions toward them respectively, said disks having their shafts sleeved about the power-shaft; an antifriction-bearing device interposed between the disks to receive the axially-directed pressure of either toward the other; a stop longitudinally fixed with respect to the power-shaft; a spring coiled about the shaft interposed between such stop and one of said sleeved shafts reacting to press the disk thereof toward the other disk; a ball-bearing device interposed between said spring and the stop; a lever operatively connected with said sleeved shaft for giving the latter endwise movement against the reaction of said spring; means on said shaft for receiving the pressure of the lever, and an antifriction device interposed between said lever and said means.

In testimony whereof I have hereunto set my hand, in the presence of two witnesses, at Kenosha, Wisconsin, this 4th day of August, A. D. 1904.

ROBERT SYMMONDS, Jr.

In presence of—
  W. H. LONSDALE,
  H. L. BLACKMAN.